(12) United States Patent
Chou et al.

(10) Patent No.: US 11,214,449 B2
(45) Date of Patent: Jan. 4, 2022

(54) GLASS PROCESSING APPARATUS AND METHODS

(71) Applicant: CORNING INCORPORATED, Corning, NY (US)

(72) Inventors: Cheng Nan Chou, Fong-Yuan (TW); Ming Hua Chuang, Kaohsiung (TW)

(73) Assignee: Corning Incorporated, Corning, NY (US)

( * ) Notice: Subject to any disclaimer, the term of this patent is extended or adjusted under 35 U.S.C. 154(b) by 97 days.

(21) Appl. No.: 16/630,091

(22) PCT Filed: Jul. 5, 2018

(86) PCT No.: PCT/US2018/040850
§ 371 (c)(1),
(2) Date: Jan. 10, 2020

(87) PCT Pub. No.: WO2019/014038
PCT Pub. Date: Jan. 17, 2019

(65) Prior Publication Data
US 2020/0216271 A1   Jul. 9, 2020

Related U.S. Application Data

(60) Provisional application No. 62/531,101, filed on Jul. 11, 2017.

(51) Int. Cl.
*B65G 49/06* (2006.01)
*B65G 47/91* (2006.01)
*C03B 35/24* (2006.01)

(52) U.S. Cl.
CPC .......... *B65G 49/067* (2013.01); *B65G 47/91* (2013.01); *C03B 35/24* (2013.01)

(58) Field of Classification Search
CPC ...... B65G 49/067; B65G 47/91; B65G 49/06; C03B 35/24; C03B 35/00
(Continued)

(56) References Cited

U.S. PATENT DOCUMENTS

| | | | |
|---|---|---|---|
| 3,385,490 A | | 5/1968 | Malmgren et al. |
| 5,002,599 A | * | 3/1991 | McMaster ........... C03B 23/0252 294/64.3 |

(Continued)

FOREIGN PATENT DOCUMENTS

| | | |
|---|---|---|
| CN | 1513739 A | 7/2004 |
| CN | 101313168 A | 11/2008 |

(Continued)

OTHER PUBLICATIONS

Chinese Patent Application No. 201880056958.9, Office Action dated Apr. 22, 2021, 8 pages (4 pages of English Translation and 4 pages of Original Document), Chinese Patent Office.

(Continued)

*Primary Examiner* — Lynn E Schwenning
(74) *Attorney, Agent, or Firm* — Ryan T. Hardee

(57) ABSTRACT

A glass processing apparatus to convey a glass sheet along a conveyance path can include a plurality of air bars spaced apart from each other along a first direction extending perpendicular to a central axis. Each air bar can include a surface with a plurality of fluid outlet ports. The glass processing apparatus can include a plurality of plates, and at least one of the plurality of plates can be positioned between ones of the plurality of air bars. Each plate can include a surface with a plurality of fluid inlet ports. The plurality of air bars and the plurality of plates can be symmetrically arranged relative to the central axis. Methods of processing
(Continued)

a glass sheet can include emitting fluid from the plurality of fluid outlet ports of each of the plurality of air bars, thereby providing a cushion of fluid.

25 Claims, 3 Drawing Sheets

(58) Field of Classification Search
USPC .......................................................... 414/676
See application file for complete search history.

(56) References Cited

U.S. PATENT DOCUMENTS

| | | | |
|---|---|---|---|
| 5,016,363 A | | 5/1991 | Krieger |
| 5,078,775 A | | 1/1992 | Maltby et al. |
| 6,505,483 B1 | * | 1/2003 | Hoetzl ................ C03B 35/24 |
| | | | 65/25.2 |
| 6,736,588 B1 | | 5/2004 | Baldwin et al. |
| 7,077,019 B2 | | 7/2006 | Weiss et al. |
| 7,428,959 B2 | | 9/2008 | Jung et al. |
| 7,607,647 B2 | | 10/2009 | Zhao et al. |
| 8,137,046 B2 | | 3/2012 | Kishimoto et al. |
| 8,142,111 B2 | | 3/2012 | Kim et al. |
| 8,297,077 B2 | * | 10/2012 | Nuttgens ............ C03B 35/24 |
| | | | 65/182.2 |
| 8,523,510 B2 | | 9/2013 | Snodgrass et al. |
| 9,038,414 B2 | | 5/2015 | Fleming et al. |
| 9,199,816 B2 | | 12/2015 | Blanding et al. |
| 9,216,924 B2 | | 12/2015 | Chang et al. |
| 10,889,438 B2 | * | 1/2021 | Kusama ............ H01L 21/67396 |
| 2001/0015520 A1 | * | 8/2001 | Gauger ................ B65H 3/0825 |
| | | | 271/18.1 |
| 2006/0042314 A1 | | 3/2006 | Abbott et al. |
| 2009/0155024 A1 | | 6/2009 | Nuttgens et al. |
| 2012/0247154 A1 | | 10/2012 | Abramov et al. |
| 2013/0127192 A1 | * | 5/2013 | Regan ................ B25J 15/0616 |
| | | | 294/185 |
| 2015/0336751 A1 | | 11/2015 | Tsunoda et al. |
| 2016/0268153 A1 | | 9/2016 | Wada |

FOREIGN PATENT DOCUMENTS

| | | |
|---|---|---|
| CN | 101523590 A | 9/2009 |
| CN | 102167502 A | 8/2011 |
| CN | 102442768 A | 5/2012 |
| CN | 103112719 A | 5/2013 |
| CN | 104211288 A | 12/2014 |
| CN | 104418497 A | 3/2015 |
| JP | 2001-010724 A | 1/2001 |
| JP | 2006-019396 A | 1/2006 |
| TW | 201529456 A | 8/2015 |

OTHER PUBLICATIONS

International Search Report and Written Opinion of the Internaitonal Searching Authority; PCT/US2018/040850; dated Sep. 11, 2018; 9 Pages; ISA/US Commissioner for Patents.

Taiwanese Patent Application No. 107123787, Office Action dated Oct. 22, 2021, 1 page (English Translation Only); Taiwanese Patent Office.

* cited by examiner

GLASS PROCESSING APPARATUS AND METHODS

CROSS-REFERENCE TO RELATED APPLICATIONS

This application is a national stage entry of International Patent Application Serial No. PCT/US2018/040850, filed on Jul. 5, 2018, which in turn, claims the benefit of priority under 35 U.S.C. § 119 of U.S. Provisional Application Ser. No. 62/531,101 filed on Jul. 11, 2017, the contents of each of which are relied upon and incorporated herein by reference in their entireties.

FIELD

The present disclosure relates generally to methods and apparatus for processing a glass sheet, and more particularly, to methods and apparatus to convey a glass sheet along a conveyance path.

BACKGROUND

It is known to convey a glass sheet. For example, it is known to convey a glass sheet by supporting the glass sheet on a cushion of fluid.

SUMMARY

The following presents a simplified summary of the disclosure in order to provide a basic understanding of some exemplary embodiments described in the detailed description.

In some embodiments, a glass processing apparatus to convey a glass sheet along a conveyance path can include a plurality of air bars spaced apart from each other along a first direction extending perpendicular to a central axis. Each air bar can include a surface with a plurality of fluid outlet ports. The glass processing apparatus can include a plurality of plates, at least one of the plurality of plates can be positioned between ones of the plurality of air bars. Each plate can include a surface with a plurality of fluid inlet ports. The plurality of air bars and the plurality of plates can be symmetrically arranged relative to the central axis.

In some embodiments, the surface of each of the plurality of air bars and the surface of each of the plurality of plates can extend along a common plane.

In some embodiments, the surface of each of the plurality of air bars and the surface of each of the plurality of plates can define a continuous surface.

In some embodiments, the surface of each of the plurality of air bars can span a width extending in the first direction from a first edge of the air bar to a second edge of the air bar, and the width of the surface of each of the plurality of air bars can be equal.

In some embodiments, a widthwise distance extending in the first direction between immediately adjacent outer air bars of the plurality of air bars can be less than a widthwise distance extending in the first direction between immediately adjacent central air bars of the plurality of air bars.

In some embodiments, an effective area of the plurality of fluid outlet ports of each air bar of the plurality of air bars can be equal.

In some embodiments, the surface of each of the plurality of plates can span a width extending in the first direction from a first edge of each plate to a second edge of each plate, and the width of the surface of at least one plate of the plurality of plates can be different than the width of the surface of one or more other plates of the plurality of plates.

In some embodiments, the width of the surface of a central plate of the plurality of plates can be greater than the width of the surface of an outer plate of the plurality of plates.

In some embodiments, an effective area of the plurality of fluid inlet ports of at least one plate of the plurality of plates can be different than an effective area of the plurality of fluid inlet ports of one or more other plates of the plurality of plates.

In some embodiments, an effective area of the plurality of fluid inlet ports of each of three centermost plates of the plurality of plates can be greater than an effective area of the plurality of fluid inlet ports of each of a first outermost plate of the plurality of plates and a second outermost plate of the plurality of plates.

In some embodiments, an effective area of the plurality of fluid inlet ports of a first intermediate plate of the plurality of plates positioned between the first outermost plate and the three centermost plates can be less than the effective area of the plurality of fluid inlet ports of each of the three centermost plates and greater than the effective area of the plurality of fluid inlet ports of the first outermost plate, and an effective area of the plurality of fluid inlet ports of a second intermediate plate of the plurality of plates positioned between the second outermost plate and the three centermost plates can be less than the effective area of the plurality of fluid inlet ports of each of the three centermost plates and greater than the effective area of the plurality of fluid inlet ports of the second outermost plate.

In some embodiments, an effective area of the plurality of fluid inlet ports of a third intermediate plate of the plurality of plates positioned between the first outermost plate and the first intermediate plate can be equal to the effective area of the plurality of fluid inlet ports of each of the three centermost plates, and an effective area of the plurality of fluid inlet ports of a fourth intermediate plate of the plurality of plates positioned between the second outermost plate and the second intermediate plate can be equal to the effective area of the plurality of fluid inlet ports of each of the three centermost plates.

In some embodiments, the conveyance path can extend along the central axis, and a method of processing a glass sheet can include conveying the glass sheet along the conveyance path.

In some embodiments, the glass processing apparatus can further include a fluid source connected to the plurality of air bars, the fluid source operable to provide fluid to each of the plurality of air bars and to emit fluid from the plurality of fluid outlet ports of each air bar.

In some embodiments, the fluid source can be operable to independently provide fluid to each of the plurality of air bars.

In some embodiments, the fluid source can be operable to emit fluid of differing pressures from the plurality of fluid outlet ports of one or more air bars of the plurality of air bars.

In some embodiments, the fluid source can be operable to emit fluid of a first pressure from the plurality of fluid outlet ports of two centermost air bars of the plurality of air bars and fluid of a second pressure from the plurality of fluid outlet ports of a first outermost air bar of the plurality of air bars and a second outermost air bar of the plurality of air bars, and the first pressure can be greater than the second pressure.

In some embodiments, the fluid source can be operable to emit fluid of a third pressure from the plurality of fluid outlet ports of a first of three air bars of the plurality of air bars positioned between the first outermost air bar and the two centermost air bars and from the plurality of fluid outlet ports of a second of three air bars of the plurality of air bars positioned between the second outermost air bar and the two centermost air bars, and the third pressure can be less than the second pressure.

In some embodiments, the plurality of fluid inlet ports of each plate of the plurality of plates can be provided without a fluid source connected to the plurality of fluid inlet ports.

In some embodiments, a method of processing a glass sheet can include emitting fluid from the plurality of fluid outlet ports of each of the plurality of air bars, thereby providing a cushion of fluid.

In some embodiments, the method can include floating the glass sheet on the cushion of fluid.

In some embodiments, the conveyance path can extend along the central axis, and the method can include conveying the glass sheet along the conveyance path on the cushion of fluid.

In some embodiments, the method can include passing at least a portion of the emitted fluid through the plurality of fluid inlet ports of each of the plurality of plates after providing the cushion of fluid.

The above embodiments are exemplary and can be provided alone or in any combination with any one or more embodiments provided herein without departing from the scope of the disclosure. Moreover, it is to be understood that both the foregoing general description and the following detailed description present embodiments of the present disclosure, and are intended to provide an overview or framework for understanding the nature and character of the embodiments as they are described and claimed. The accompanying drawings are included to provide a further understanding of the embodiments, and are incorporated into and constitute a part of this specification. The drawings illustrate various embodiments of the disclosure, and together with the description, serve to explain the principles and operations thereof.

BRIEF DESCRIPTION OF THE DRAWINGS

These and other features, embodiments, and advantages of the present disclosure can be further understood when read with reference to the accompanying drawings.

DETAILED DESCRIPTION

Figure 1:
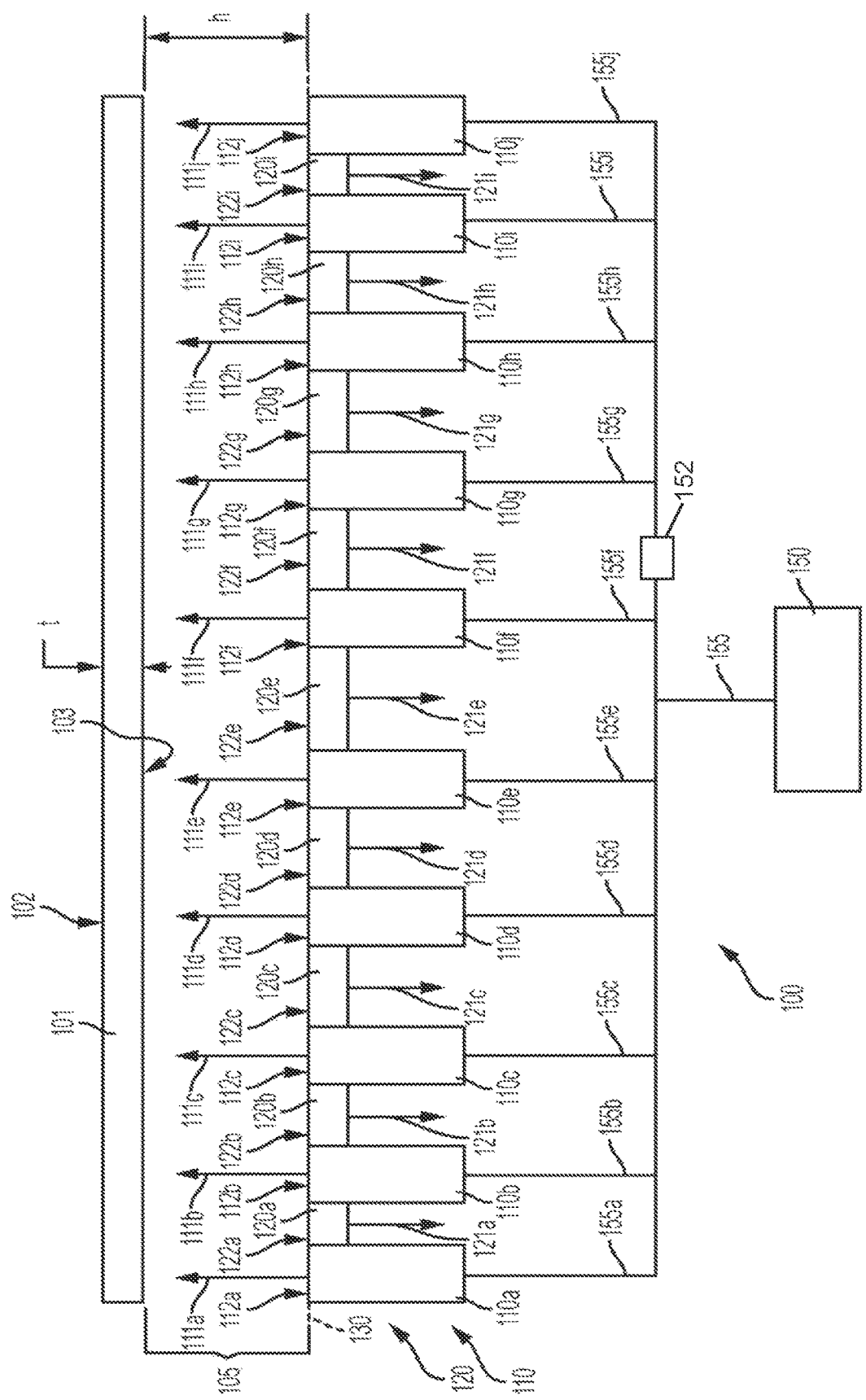
FIG. 1 illustrates a schematic side view of an exemplary glass processing apparatus including a plurality of air bars, a plurality of plates, and a glass sheet in accordance with embodiments of the disclosure.

Methods and apparatus will now be described more fully hereinafter with reference to the accompanying drawings in which exemplary embodiments of the disclosure are shown. Whenever possible, the same reference numerals are used throughout the drawings to refer to the same or like parts. However, this disclosure may be embodied in many different forms and should not be construed as limited to the embodiments set forth herein.

Glass sheets are commonly fabricated by flowing molten material to a forming body whereby a glass ribbon can be formed by a variety of ribbon forming processes including, float, slot draw, down-draw (including fusion down-draw), up-draw, press roll or other forming processes. The glass ribbon from any of these processes can then be subsequently divided to provide one or more glass sheets. In some embodiments, processing of the glass sheet can include transporting the glass sheet from one location to another location. Additionally, in some embodiments, the one or more glass sheets can be suitable for further processing into a desired application, including but not limited to, a display application, a lighting application, a photovoltaic application or any other application benefiting from the use of high quality glass sheets. For example, the one or more glass sheets can be used in a variety of display applications, including liquid crystal displays (LCDs), electrophoretic displays (EPD), organic light emitting diode displays (OLEDs), plasma display panels (PDPs), or the like.

FIG. 1 schematically illustrates a side view of an exemplary glass processing apparatus 100 including a glass sheet 101 in accordance with embodiments of the disclosure. In some embodiments, a thickness "t" of the glass sheet 101 defined between a first major surface 102 and an opposing second major surface 103 of the glass sheet 101 can be, for example, from about 25 micrometers (µm) to about 3 millimeters (mm), for example, from about 25 micrometers to about 2 millimeters, for example, from about 25 micrometers to about 1 millimeter, for example, from about 25 micrometers to about to about 0.5 millimeters, for example, from about 25 micrometers to about 400 micrometers, for example, from about 25 micrometers to about 300 micrometers, for example, from about 25 micrometers to about 200 micrometers, for example, from about 25 micrometers to about 100 micrometers, for example, from about 25 micrometers to about 50 micrometers, although other thicknesses can be provided in further embodiments, without departing from the scope of the disclosure. In addition, in some embodiments, the glass sheet 101 can include a variety of compositions including but not limited to glass, ceramic, glass-ceramic, soda-lime glass, borosilicate glass, aluminoborosilicate glass, an alkali-containing glass, an alkali-free glass, or any combination thereof. In some embodiments, a density of the glass sheet 101 can be about 2.16 grams per cubic centimeter ($g/cm^3$), an elastic modulus of the glass sheet 101 can be about 73,600 megapascal (MPa), and a Poisson's ratio of the glass sheet 101 can be about 0.23. Additionally, in some embodiments, the glass sheet 101 can span a dimension (e.g., width) of about 2940 mm along the first direction 201, and a dimension (e.g., length) of about 3370 mm along a direction perpendicular to the first direction 201.

Figure 2:
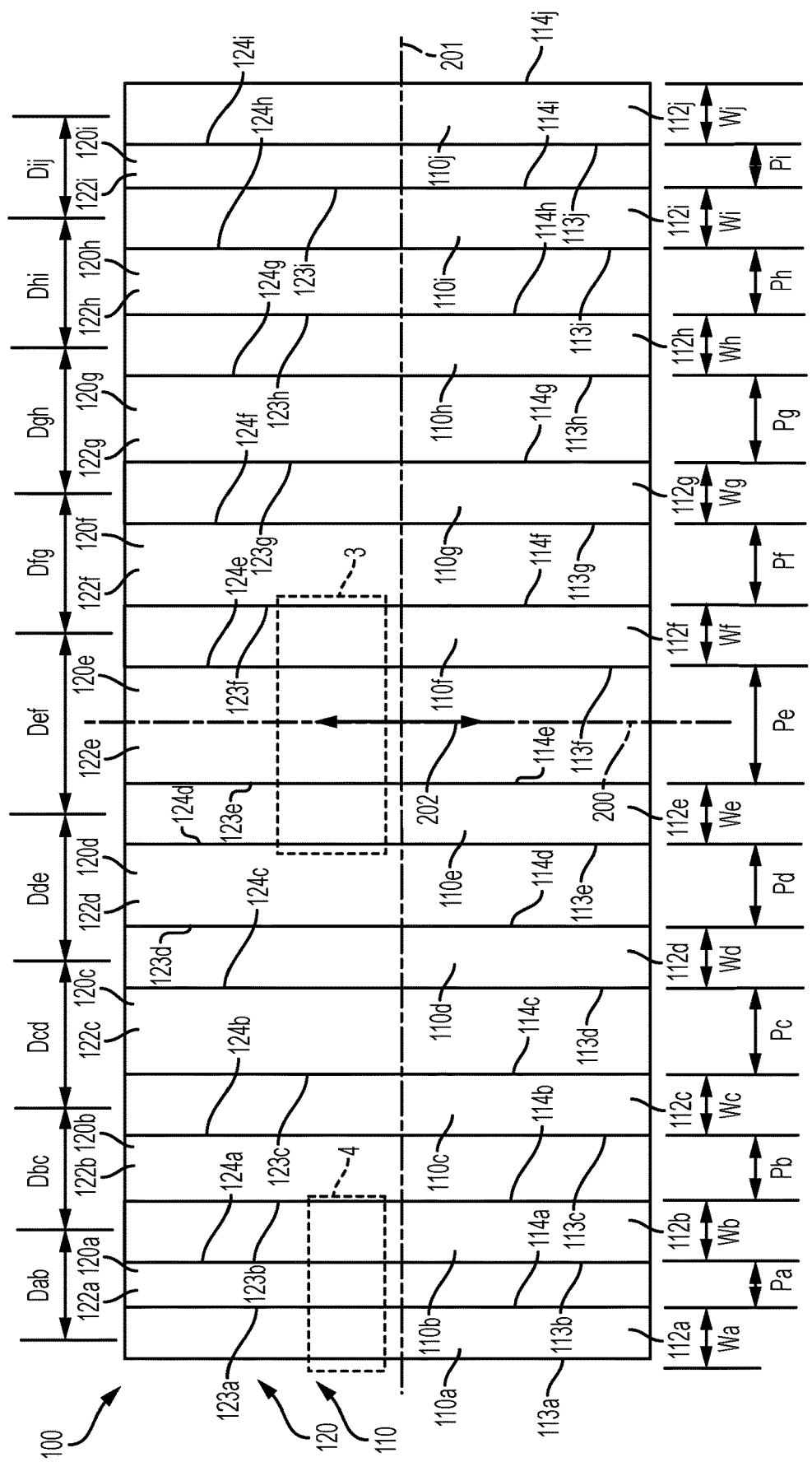
FIG. 2 illustrates a schematic top view of the exemplary glass processing apparatus of FIG. 1 including a conveyance path with the glass sheet removed for clarity in accordance with embodiments of the disclosure.

FIG. 2 schematically illustrates a top view of the glass processing apparatus 100 of FIG. 1 with the glass sheet 101 removed for clarity. In some embodiments, the glass processing apparatus 100 can include a plurality of air bars 110 spaced apart from each other along a first direction 201 extending perpendicular to a central axis 200 of the glass processing apparatus 100. Additionally, in some embodiments, the glass processing apparatus 100 can include a plurality of plates 120, at least one of the plurality of plates positioned between ones of the plurality of air bars 110. In some embodiments, the plurality of air bars 110 and the plurality of plates 120 can be symmetrically arranged relative to the central axis 200. In some embodiments, a conveyance path 202 can extend along the central axis 200, and the glass processing apparatus 100 can be operable to convey the glass sheet 101 along the conveyance path 202.

Throughout the disclosure, various and specific configurations, quantities, arrangements, dimensions, and other features of the plurality of air bars 110 and the plurality of plates 120 can be provided. In some embodiments, the various and specific configurations, quantities, arrangements, dimensions, and other features of the plurality of air bars 110 and the plurality of plates 120 can be determined based on, for example, computer modeling (e.g., computational fluid dynamics). In some embodiments, the various and specific configurations, quantities, arrangements, dimensions, and other features of the plurality of air bars 110 and the plurality of plates 120 can obtain remarkable advantages relating to processing the glass sheet 101 that cannot be achieved by glass processing apparatus not including the various and specific configurations, quantities, arrangements, dimensions, and other features of the plurality of air bars 110 and the plurality of plates 120. Moreover, unless otherwise noted, one or more of the features of one or more of the plurality of air bars 110 and one or more of the plurality of plates 120 can be provided, alone or in combination, with features explicitly disclosed in the disclosure as well as with features not explicitly disclosed in the disclosure, without departing from the scope of the disclosure. Therefore, numerous exemplary embodiments are disclosed with the understanding that each embodiment, alone or in combination with other exemplary embodiments, can be considered complete and within the scope of the disclosure.

Figure 3:
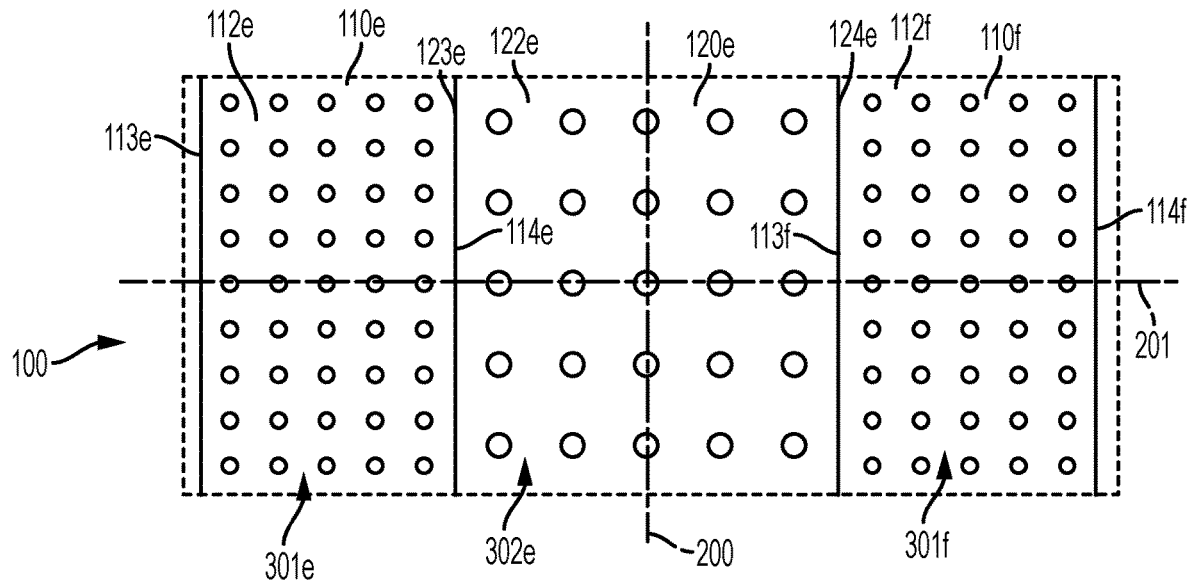
FIG. 3 shows a view of a central portion of the exemplary conveyance device identified by numeral 3 of FIG. 2 including a plurality of fluid outlet ports of an air bar and a plurality of fluid inlet ports of a plate in accordance with embodiments of the disclosure.

As shown in FIG. 1 and FIG. 2, in some embodiments, each air bar 110a-j can include a surface 112a-j with a plurality of fluid outlet ports 301a-b (See FIG. 4) and 301e-f (See FIG. 3). In some embodiments, the plurality of air bars 110 can include an enclosure to contain fluid (e.g., air) with the surface 112a-j defining at least a portion of the enclosure. In some embodiments, the plurality of fluid outlet ports can be one or more of machined (e.g., drilled), manufactured, and formed in the surface 112a-j to provide access from inside the enclosure to outside the enclosure such that the fluid can pass from inside the enclosure to outside the enclosure through the plurality of fluid outlet ports of the plurality of air bars 110.

As shown in FIG. 1 and FIG. 2, in some embodiments, each plate 120a-i can include a surface 122a-i with a plurality of fluid inlet ports 302a (See FIG. 4) and 302e (See FIG. 3). In some embodiments, the plurality of plates 120 can be a solid material and the plurality of fluid inlet ports can be one or more of machined (e.g., drilled), manufactured, and formed in the surface 122a-i to extend through the solid material such that fluid (e.g., air) can pass from one side of the plurality of plates 120 through the plurality of fluid inlet ports to another side of the plurality of plates 120.

Figure 4:
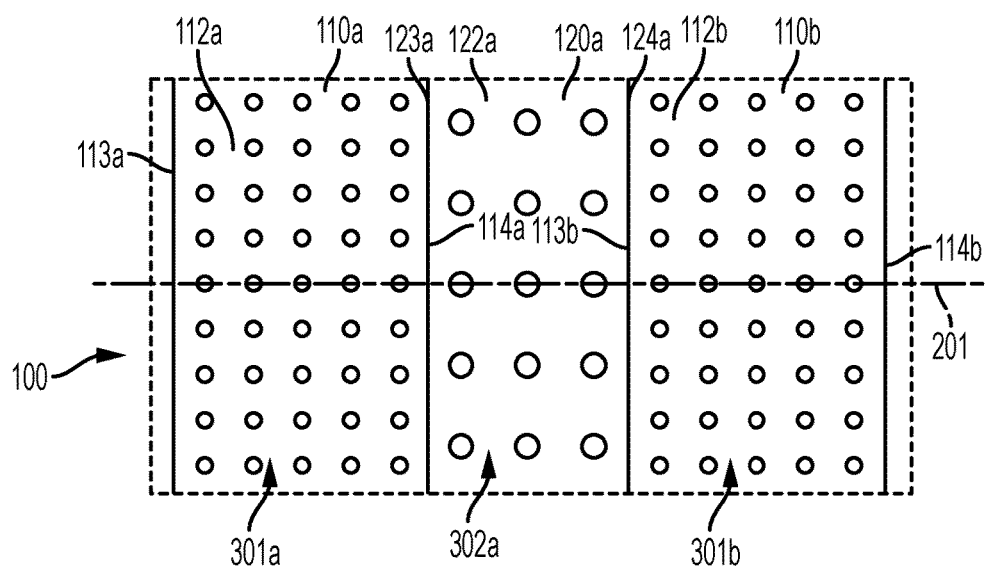
FIG. 4 shows a view of an outer portion of the exemplary conveyance device identified by numeral 4 of FIG. 2 including a plurality of fluid outlet ports of an air bar and a plurality of fluid inlet ports of a plate in accordance with embodiments of the disclosure.

Additionally, for simplicity and not limitation, in FIG. 1 and FIG. 2, the plurality of fluid outlet ports of the plurality of air bars 110 and the plurality of fluid inlet ports of the plurality of plates 120 are not illustrated. Rather, FIG. 3 shows a view of a central portion of the glass processing apparatus 100 identified by numeral 3 of FIG. 2, and FIG. 4 shows a view of an outer portion of the glass processing apparatus 100 identified by numeral 4 of FIG. 2. For example, one embodiment of the plurality of fluid outlet ports 301a of air bar 110a and the plurality of fluid outlet ports 301b of air bar 110b are shown in FIG. 4. One embodiment of the plurality of fluid outlet ports 301e of air bar 110e and the plurality of fluid outlet ports 301f of air bar 110f are shown in FIG. 3. Therefore, although not explicitly shown, it is to be understood that one or more of the plurality of air bars (e.g., air bar 110c-d, 110g-j) can include same or similar features of the plurality of air bars (e.g., air bar 110a-b, 110e-f) shown in FIG. 3 and FIG. 4 without departing from the scope of the disclosure. Similarly, one embodiment of the plurality of fluid inlet ports 302a of plate 120a are shown in FIG. 4, and one embodiment of the plurality of fluid inlet ports 302e of plate 120e are shown in FIG. 3. Although not explicitly shown, it is to be understood that one or more of the plurality of plates (e.g., plate 120b-d, 120f-i) can include same or similar features of the plates (e.g., plate 120a, 120e) shown in FIG. 3 and FIG. 4 without departing from the scope of the disclosure.

Turning back to FIG. 1 and FIG. 2, in some embodiments, plate 120a can be positioned between air bar 110a and air bar 110b; plate 120b can be positioned between air bar 110b and air bar 110c; plate 120c can be positioned between air bar 110c and air bar 110d; plate 120d can be positioned between air bar 110d and air bar 110e; plate 120e can be positioned between air bar 110e and air bar 110f; plate 120f can be positioned between air bar 110f and air bar 110g; plate 120g can be positioned between air bar 110g and air bar 110h; plate 120h can be positioned between air bar 110h and air bar 110i; and plate 120i can be positioned between air bar 110i and air bar 110j. In some embodiments, a method of processing the glass sheet 101 can include emitting fluid from the plurality of fluid outlet ports 301a-b, 301e-f (See FIG. 3 and FIG. 4) of each of the plurality of air bars 110, thereby providing the cushion of fluid 105. For example, in some embodiments, each of the air bars 110a-j can emit fluid from a respective plurality of fluid outlet ports as respectively shown by arrows 111a-j in FIG. 1. In some embodiments, providing the plurality of air bars 110 and the plurality of plates 120 with the relative positions described can facilitate creation and maintenance of a cushion of fluid 105 (see FIG. 1) on which the glass sheet 101 can float.

In some embodiments, the method can include floating the glass sheet 101 on the cushion of fluid 105. As shown in FIG. 1, in some embodiments, the glass sheet 101 can float on the cushion of fluid 105 at a height "h" measured from one or more surfaces 112a-j of the respective plurality of air bars 110a-j and/or one or more surfaces 122a-i of the respective plurality of plates 120a-i to the second major surface 103 of the glass sheet 101. In some embodiments, the height "h" can be constant along the central axis 200 and/or constant along the first direction 201. For example, in some embodiments, the glass processing apparatus 100 can float at least a portion of the second major surface 103 (e.g., the entire second major surface 103) of the glass sheet 101 on the cushion of fluid 105 at a constant height "h" as the at least a portion of the second major surface 103 conveys along the conveyance path 202 along a length (e.g., the entire length) of the central axis 200. In some embodiments, the glass sheet 101 can include a planar profile (e.g., first major surface 102 and second major surface 103 are planar and parallel) while the glass sheet 101 floats on the cushion of fluid 105. In some embodiments, floating the glass sheet 101 on the cushion of fluid 105 at a constant height "h" with the glass sheet 101 including a planar profile can reduce or eliminate bending stress that can otherwise be present in the glass sheet if, for example, the height "h" was to vary along the central axis 200 and/or along the first direction 201.

In some embodiments, the height "h" can be from about 5 mm to about 15 mm; for example, from about 8 mm to about 12 mm; for example, about 10 mm. Floating the glass sheet 101 on the cushion of fluid 105 can facilitate processing (e.g., placement, transport, conveyance, packaging) of the glass sheet 101 in a non-contact manner, where only the cushion of fluid 105 physically contacts the glass sheet 101. In some embodiments, non-contact processing of the glass sheet 101 can reduce the probability of damaging, for example scratching and/or cracking the glass sheet 101 that can otherwise occur, for example, when processing the glass sheet 101 in a manner that includes physically contacting the glass sheet 101 with one or more solid objects such as a machine, equipment, mechanical part, or other object. Additionally, in some embodiments, floating the glass sheet 101 on the cushion of fluid 105 at a predetermined height "h" can prevent contact between the glass sheet 101 and the glass processing apparatus 100 while processing the glass sheet 101. For example, preventing contact between the glass sheet 101 and the glass processing apparatus 100 (e.g., one or more surfaces 112a-j of the plurality of air bars 110 and/or one or more surfaces 122a-i of the plurality of plates 120) can reduce the probability of damaging, for example, scratching and/or cracking the glass sheet 101 that can otherwise occur, for example, when processing the glass sheet 101 in a manner that includes physically contacting the glass sheet 101 with the glass processing apparatus 100.

Referring to FIG. 2, in some embodiments, the conveyance path 202 can extend along the central axis 200, and the method can include conveying the glass sheet 101 along the conveyance path 202 on the cushion of fluid 105. Additionally, in some embodiments, the method can include passing at least a portion of the emitted fluid through the plurality of fluid inlet ports of each of the plurality of plates 120 after providing the cushion of fluid 105. For example, as shown by arrows 121a-i, at least a portion of the emitted fluid can pass through a respective plurality of fluid inlet ports of respective plates 120a-i of the plurality of plates 120.

In some embodiments, the surface 112a-j of each respective air bar 110a-j can span a corresponding width Wa-j extending in the first direction 201 from a corresponding first edge 113a-j of the respective air bar 110a-j to a corresponding second edge 114a-j of the respective air bar 110a-j. In some embodiments, the width of each surface 112a-j of the plurality of air bars 110 can be equal (e.g., width Wa=width Wb=width Wc=width Wd=width We=width Wf=width Wg=width Wh=width Wi=width Wj). In some embodiments, providing the surfaces 112a-j of the plurality of air bars 110 with the relative widths Wa-j can facilitate creation and maintenance of the cushion of fluid 105 on which the glass sheet 101 can float.

As further shown in FIG. 2, in some embodiments, the surface 122a-i of each of the respective plates 120a-i can span a corresponding width Pa-i extending in the first direction 201 from a corresponding first edge 123a-i of the respective plate 120a-i to a corresponding second edge 124a-i of the respective plate 120a-i. When symmetrically arranged relative to the central axis 200, in some embodiments, width Pa=width Pi, width Pb=width Ph, width Pc=width Pg, width Pd=width Pt Additionally, in some embodiments, the width Pa-i of the surface 122a-i of at least one plate 120a-i of the plurality of plates 120 can be different than the width Pa-i of the surface 122a-i of one or more other plates 120a-i of the plurality of plates 120. For example, in some embodiments, the width of the surface of one or more central plates of the plurality of plates 120 can be greater than the width of the surface of one or more outer plates of the plurality of plates 120. The locations of central plates and outer plates can correspond to a position of one or more plates of the plurality of plates 120 along the first direction 201 relative to the central axis 200, with one or more plates positioned relatively closer to the central axis 200 being considered central plates relative to one or more plates positioned relatively farther from the central axis 200.

For example, in some embodiments, the width Pb of surface 122b of plate 120b can be greater than the width Pa of surface 122a of plate 120a, and the width Ph of surface 122h of plate 120h can be greater than the width Pi of surface 122i of plate 120i. In some embodiments, the width Pd of surface 122d of plate 120d, the width Pe of surface 122e of plate 120e, and the width Pf of surface 122f of plate 120f can be equal to each other and also greater than the width Pc of surface 122c of plate 120c and the width Pg of surface 122g of plate 120g which can be equal to each other and also greater than the width Pa of surface 122a of plate 120a and the width Pi of surface 122i of plate 120i which can be equal to each other. In some embodiments, the width of a surface (e.g., surface 122e) of a centermost plate (e.g., plate 120e) of the plurality of plates 120 can be greater than the width of a surface (e.g., surface 122a, surface 122i) of an outermost plate (e.g., plate 120a, plate 120i) of the plurality of plates 120. In some embodiments, width Pe>(width Pd=width Pf)>(width Pc=width Pg)>(width Pb=width Ph)> (width Pa=width Pi). In some embodiments, providing the surfaces 122a-i of the plurality of plates 120 with the relative widths Pa-i described can facilitate creation and maintenance of the cushion of fluid 105 on which the glass sheet 101 can float.

Turning back to FIG. 1, in some embodiments, the surface 112a-j of each of the corresponding air bars 110a-j and the surface 122a-i of each of the corresponding plates 120a-i can extend along a common plane 130. For example, in some embodiments, the surfaces 112a-j of each of the corresponding air bars 110a-j and the surfaces 122a-i of each of the plurality of the corresponding plates 120a-i can define a continuous surface. For example, in some embodiments, the first edge 113a of air bar 110a can define a first outermost edge of the continuous surface and the second edge 114j of air bar 110j can define a second outermost edge of the continuous surface. The surfaces 112a-j of the plurality of air bars 110 and the surfaces 122a-i of the plurality of plates 120 can continuously span along the first direction 201 from the first outermost edge to the second outermost edge, thereby defining the continuous surface. In some embodiments, the continuous surface can be planar (e.g., coplanar with common plane 130). Additionally, in some embodiments, the continuous surface and/or the common plane 130 can be perpendicular relative the direction of gravity.

In some embodiments, the continuous surface defined by the surfaces 112a-j of the plurality of air bars 110 and the surfaces 122a-i of the plurality of plates 120 can be provided as a single continuous piece of material defining the continuous surface. Alternatively, in some embodiments, the continuous surface defined by the surfaces 112a-j of the plurality of air bars 110 and the surfaces 122a-i of the plurality of plates 120 can be provided by positioning the plurality of air bars 110 and the plurality of plates 120 in abutting relationship with respect to each other. For example, in some embodiments, the second edge 114a of air bar 110a can abut the first edge 123a of plate 120a, the second edge 124a of plate 120a can abut the first edge 113b of air bar 110b, the second edge 114b of air bar 110b can abut the first edge 123b of plate 120b, the second edge 124b of plate 120*b* can abut the first edge 113*c* of air bar 110*c*, the second edge 114*c* of air bar 110*c* can abut the first edge 123*c* of plate 120*c*, the second edge 124*c* of plate 120*c* can abut the first edge 113*d* of air bar 110*d*, the second edge 114*d* of air bar 110*d* can abut the first edge 123*d* of plate 120*d*, the second edge 124*d* of plate 120*d* can abut the first edge 113*e* of air bar 110*e*, the second edge 114*e* of air bar 110*e* can abut the first edge 123*e* of plate 120*e*, the second edge 124*e* of plate 120*e* can abut the first edge 113*f* of air bar 110*f*, the second edge 114*f* of air bar 110*f* can abut the first edge 123*f* of plate 120*f*, the second edge 124*f* of plate 120*f* can abut the first edge 113*g* of air bar 110*g*, the second edge 114*g* of air bar 110*g* can abut the first edge 123*g* of plate 120*g*, the second edge 124*g* of plate 120*g* can abut the first edge 113*h* of air bar 110*h*, the second edge 114*h* of air bar 110*h* can abut the first edge 123*h* of plate 120*h*, the second edge 124*h* of plate 120*h* can abut the first edge 113*i* of air bar 110*i*, the second edge 114*i* of air bar 110*i* can abut the first edge 123*i* of plate 120*i*, and the second edge 124*i* of plate 120*i* can abut the first edge 113*j* of air bar 110*j*.

In some embodiments, by providing the plurality of air bars 110 and the plurality of plates 120 to include the common plane 130 and/or the continuous surface, the plurality of air bars 110 and the plurality of plates 120 can, together, provide the glass processing apparatus 100 with a structure that facilitates creation and maintenance of a uniform, stable cushion of fluid 105 on which the glass sheet 101 can float. For example, in some embodiments, the fluid emitted from the plurality of air bars 110 can form the cushion of fluid 105, thereby lifting the glass sheet 101 away from the surfaces 112*a-j* of each of the corresponding air bars 110*a-j*. In some embodiments, the plurality of plates 120 can regulate the flow (e.g., pressure, velocity, volume) of the emitted fluid to provide a stable, uniform cushion of fluid 105. For example, in some embodiments, the surfaces 122*a-i* of the corresponding plates 120*a-i* can contain at least a portion of the emitted fluid between the plurality of plates 120 and the glass sheet 101 to form the cushion of fluid 105. Additionally, the plurality of fluid inlet ports of the plurality of plates 120 can permit at least a portion of the emitted fluid to pass through a respective plurality of fluid inlet ports of the plurality of plates 120, thereby regulating the amount (e.g., volume) of fluid defining the cushion of fluid 105 as well as regulating the pressure and velocity of the fluid defining the cushion of fluid 105.

As shown in FIG. 2, in some embodiments, the plurality of air bars 110 can be spaced a widthwise distance Dab, Dbc, Dcd, Dde, Def, Dfg, Dgh, Dhi, Dij extending in the first direction 201 from each other. In some embodiments, the widthwise distance can be measured from a centerline of each of the plurality of air bars 110. For example, air bar 110*a* can be spaced a widthwise distance Dab from air bar 110*b*; air bar 110*b* can be spaced a widthwise distance Dbc from air bar 110*c*; air bar 110*c* can be spaced a widthwise distance Dcd from air bar 110*d*; air bar 110*d* can be spaced a widthwise distance Dde from air bar 110*d*; air bar 110*e* can be spaced a widthwise distance Def from air bar 110*f*; air bar 110*f* can be spaced a widthwise distance Dfg from air bar 110*g*; air bar 110*g* can be spaced a widthwise distance Dgh from air bar 110*h*; air bar 110*h* can be spaced a widthwise distance Dhi from air bar 110*i*; and air bar 110*i* can be spaced a widthwise distance Dij from air bar 110*j*.

In some embodiments, a widthwise distance extending in the first direction 201 between immediately adjacent outer air bars (e.g., widthwise distance Dab between air bar 110*a* and air bar 110*b*, widthwise distance Dij between air bar 110*i* and air bar 110*j*) of the plurality of air bars 110 can be less than a widthwise distance extending in the first direction 201 between immediately adjacent central air bars (e.g., one or more of widthwise distance Def between air bar 110*e* and air bar 110*f*, widthwise distance Dde between air bar 110*d* and air bar 110*e*, widthwise distance Dfg between air bar 110*f* and air bar 110*g*, widthwise distance Dcd between air bar 110*c* and air bar 110*d*, widthwise distance Dgh between air bar 110*g* and air bar 110*h*, widthwise distance Dbc between air bar 110*b* and air bar 110*c*, widthwise distance Dhi between air bar 110*h* and air bar 110*i*) of the plurality of air bars 110. In some embodiments, widthwise distance Def>(widthwise distance Dde=widthwise distance Dfg)>(widthwise distance Dcd=widthwise distance Dgh)>(widthwise distance Dbc=widthwise distance Dhi)>(widthwise distance Dab=widthwise distance Dij). In some embodiments, widthwise distance Def can be about 340 millimeters (mm), widthwise distance Dde and widthwise distance Dfg can be about 330 mm, widthwise distance Dcd and widthwise distance Dgh can be about 320 mm, widthwise distance Dbc and widthwise distance Dhi can be about 315 mm, and widthwise distance Dab and widthwise distance Dij can be about 265 mm. In some embodiments, providing the plurality of air bars 110 spaced apart from each other at the relative widthwise distances described can facilitate creation and maintenance of the cushion of fluid 105 on which the glass sheet 101 can float.

Turning back to FIG. 1, in some embodiments, the glass processing apparatus 100 can further include a fluid source 150 (e.g., blower, pump, fan) connected to the plurality of air bars 110. For example, fluid line 155 can connect the fluid source 150 to the plurality of air bars 110. In some embodiments, the fluid source 150 can be operable to provide fluid to each of the plurality of air bars 110 and to then emit fluid from the plurality of fluid outlet ports of each air bar 110*a-j*. In some embodiments, a single fluid source 150 can be provided; however, in some embodiments, more than one fluid source can be provided. For example, in some embodiments, a separate, dedicated fluid source can be provided for each air bar 110*a-j* of the plurality of air bars 110. In some embodiments, the plurality of fluid inlet ports of each plate 120*a-i* of the plurality of plates 120 can be provided without a fluid source connected to the plurality of fluid inlet ports of the plurality of plates 120. For example, in some embodiments, fluid flow through the plurality of fluid inlet ports of the plurality of plates 120 can occur naturally (e.g., based on the flow of the emitted flow and other fluid flow existing in a flow region around the plurality of plates) without external influence from a separate fluid source (e.g., blower, pump, fan, vacuum) connected to the plurality of fluid inlet ports of the plurality of plates 120. Alternatively, in some embodiments, a vacuum source (not shown) can be provided to draw (e.g., suck) the emitted fluid through the plurality of fluid inlet ports of the plurality of plates 120. In some embodiments, providing the plurality of fluid inlet ports of each plate 120*a-i* of the plurality of plates 120 without a fluid source or, optionally, with a vacuum source can facilitate creation and maintenance of the cushion of fluid 105 on which the glass sheet 101 can float.

In some embodiments, the fluid source 150 can be operable to independently provide fluid to each of the plurality of air bars 110. For example, in some embodiments, one or more control valves and flow regulators 152 can be provided to independently control one or more of a volume, pressure, and velocity of the flow of fluid to each of the plurality of air bars 110. In some embodiments, fluid line 155*a* can connect the fluid source 150 to air bar 110*a* to emit fluid (as shown by arrow 111*a*); fluid line 155*b* can connect the fluid source 150 to air bar 110*b* to emit fluid (as shown by arrow 111*b*); fluid line 155*c* can connect the fluid source 150 to air bar 110*c* to emit fluid (as shown by arrow 111*c*); fluid line 155*d* can connect the fluid source 150 to air bar 110*d* to emit fluid (as shown by arrow 111*d*); fluid line 155*e* can connect the fluid source 150 to air bar 110*e* to emit fluid (as shown by arrow 111*e*); fluid line 155*f* can connect the fluid source 150 to air bar 110*f* to emit fluid (as shown by arrow 111*f*); fluid line 155*g* can connect the fluid source 150 to air bar 110*g* to emit fluid (as shown by arrow 111*g*); fluid line 155*h* can connect the fluid source 150 to air bar 110*h* to emit fluid (as shown by arrow 111*h*); fluid line 155*i* can connect the fluid source 150 to air bar 110*i* to emit fluid (as shown by arrow 111*i*); and fluid line 155*j* can connect the fluid source 150 to air bar 110*j* to emit fluid (as shown by arrow 111*j*).

In some embodiments, the fluid source 150 can be operable to emit fluid of differing pressures from the plurality of fluid outlet ports of one or more air bars of the plurality of air bars 110. For example, in some embodiments, the fluid source 150 can be operable to emit fluid of a first pressure from the plurality of fluid outlet ports of two centermost air bars (e.g., air bar 110*e* and air bar 110*f*) of the plurality of air bars 110 and fluid of a second pressure from the plurality of fluid outlet ports of a first outermost air bar (e.g., air bar 110*a*) of the plurality of air bars 110 and a second outermost air bar (e.g., air bar 110*j*) of the plurality of air bars 110. In some embodiments, the first pressure can be greater than the second pressure. In some embodiments, the fluid source 150 can be operable to emit fluid of a third pressure from the plurality of fluid outlet ports of a first of three air bars (e.g., air bar 110*b*, air bar 110*c*, air bar 110*d*) of the plurality of air bars 110 positioned between the first outermost air bar (e.g., air bar 110*a*) and the two centermost air bars (e.g., air bar 110*e*, air bar 110*f*) and from the plurality of fluid outlet ports of a second of three air bars (e.g., air bar 110*g*, air bar 110*h*, air bar 110*i*) of the plurality of air bars 110 positioned between the second outermost air bar (e.g., air bar 110*j*) and the two centermost air bars (e.g., air bar 110*e*, air bar 110*f*). In some embodiments, the third pressure can be less than the second pressure.

In some embodiments, the differing fluid pressures from the plurality of fluid outlet ports of one or more air bars of the plurality of air bars 110 can be controlled by selecting a velocity at which the air can be emitted from the plurality of fluid outlet ports of the plurality of air bars 110. In some embodiments, a first velocity providing the first pressure can be greater than a second velocity providing the second pressure. Additionally, in some embodiments, a third velocity providing the third pressure can be less than the second velocity providing the second pressure. For example, in some embodiments, the first pressure from the plurality of fluid outlet ports of two centermost air bars (e.g., air bar 110*e* and air bar 110*f*) can be controlled by emitting air at a first velocity of about 21.2 meters/second (m/s). In some embodiments, the second pressure from the plurality of fluid outlet ports of the first outermost air bar (e.g., air bar 110*a*) and the second outermost air bar (e.g., air bar 110*j*) can be controlled by emitting air at a second velocity of about 20 m/s. In some embodiments, the third pressure from the plurality of fluid outlet ports of the first of three air bars (e.g., air bar 110*b*, air bar 110*c*, air bar 110*d*) positioned between the first outermost air bar (e.g., air bar 110*a*) and the two centermost air bars (e.g., air bar 110*e*, air bar 110*f*) and from the plurality of fluid outlet ports of the second of three air bars (e.g., air bar 110*g*, air bar 110*h*, air bar 110*i*) positioned between the second outermost air bar (e.g., air bar 110*j*) and the two centermost air bars (e.g., air bar 110*e*, air bar 110*f*) can be controlled by emitting air at a third velocity of about 18.75 m/s. Accordingly, by selecting relative velocities at which air can be emitted from the plurality of fluid outlet ports of the respective plurality of air bars 110, fluid of differing pressures can be emitted from the plurality of fluid outlet ports of one or more air bars of the plurality of air bars 110.

In some embodiments, an effective area of the plurality of fluid outlet ports of each air bar of the plurality of air bars 110 can be equal. For example, with respect to FIG. 3, an effective area of the fluid outlet ports 301*e* of air bar 110*e* can be equal to an effective area of the fluid outlet ports 301*f* of air bar 110*f*. Likewise, with respect to FIG. 4, an effective area of the fluid outlet ports 301*a* of air bar 110*a* can be equal to an effective area of the fluid outlet ports 301*b* of air bar 110*b*. In some embodiments, the effective area can be calculated as the sum of the area of the opening of each fluid outlet port of the plurality of fluid outlet ports for a representative region of the respective air bar. For example, the area of a single fluid outlet port can be calculated based on the shape and size of the opening of the fluid outlet port. For a circular opening, the area of a single fluid outlet port could, therefore, be calculated as $A = \pi \times r^2$. For fluid outlet ports having openings of other shapes (e.g., squares, rectangles, triangles, etc.) the area can be calculated in a similar manner using a corresponding equation. The effective area of the fluid outlet ports of the plurality of air bars 110 can then be determined by summing the individual areas of the openings of each fluid outlet port of the plurality of fluid outlet ports for the representative region.

In addition or alternatively, in some embodiments, an effective area of the plurality of fluid inlet ports of at least one plate of the plurality of plates 120 can be different than an effective area of the plurality of fluid inlet ports of one or more other plates of the plurality of plates 120. The effective area of the plurality of fluid inlet ports of the plurality of plates 120 can be calculated in a same or similar manner as the effective area of the plurality of fluid outlet ports of the plurality of air bars 110. In some embodiments, providing different effective areas of the plurality of fluid inlet ports of the plurality of plates 120 can control one or more of an air pressure, velocity, and volume of fluid of the cushion of fluid 105 to provide a uniform, stable cushion of fluid 105 on which the glass sheet 101 can float. For example, in some embodiments, an effective area of the plurality of fluid inlet ports of each of three centermost plates (e.g., plate 120*d*, plate 120*e*, plate 120*f*) of the plurality of plates 120 can be greater than an effective area of the plurality of fluid inlet ports of each of a first outermost plate (e.g., plate 120*a*) of the plurality of plates 120 and a second outermost plate (e.g., plate 120*i*) of the plurality of plates 120.

In some embodiments, an effective area of the plurality of fluid inlet ports of a first intermediate plate (e.g., plate 120*c*) of the plurality of plates 120 positioned between the first outermost plate (e.g., plate 120*a*) and the three centermost plates (e.g., plate 120*d*, plate 120*e*, plate 120*f*) can be less than the effective area of the plurality of fluid inlet ports of each of the three centermost plates (e.g., plate 120*d*, plate 120*e*, plate 120*f*) and greater than the effective area of the plurality of fluid inlet ports of the first outermost plate (e.g., plate 120*a*). Additionally, in some embodiments, an effective area of the plurality of fluid inlet ports of a second intermediate plate (e.g., plate 120*g*) of the plurality of plates 120 positioned between the second outermost plate (e.g., plate 120*i*) and the three centermost plates (e.g., plate 120*d*, plate 120*e*, plate 120*f*) can be less than the effective area of the plurality of fluid inlet ports of each of the three centermost plates (e.g., plate 120*d*, plate 120*e*, plate 120*f*) and greater than the effective area of the plurality of fluid inlet ports of the second outermost plate (e.g., plate 120i).

In some embodiments, an effective area of the plurality of fluid inlet ports of a third intermediate plate (e.g., plate 120b) of the plurality of plates positioned between the first outermost plate (e.g., plate 120a) and the first intermediate plate (e.g., plate 120c) can be equal to the effective area of the plurality of fluid inlet ports of each of the three centermost plates (e.g., plate 120d, plate 120e, plate 120f). Additionally, in some embodiments, an effective area of the plurality of fluid inlet ports of a fourth intermediate plate (e.g., plate 120h) of the plurality of plates positioned between the second outermost plate (e.g., plate 120i) and the second intermediate plate (e.g., plate 120g) can be equal to the effective area of the plurality of fluid inlet ports of each of the three centermost plates (e.g., plate 120d, plate 120e, plate 120f).

In some embodiments, the effective area of the plurality of fluid inlet ports of the plurality of plates 120 can be selected by providing a predetermined quantity of fluid inlet ports having openings of the same size for a representative region of a respective plate of the plurality of plates 120. In addition or alternatively, in some embodiments, the effective area of the plurality of fluid inlet ports of the plurality of plates 120 can be selected by providing a plurality of fluid inlet ports having openings of different shapes and sizes for a representative region of a respective plate of the plurality of plates 120.

For example, as shown in FIG. 4, plate 120a can include three fluid inlet ports 302a arranged on the surface 122a between the first edge 123a and the second edge 124a along the first direction 201. Likewise, as shown in FIG. 3, plate 120e can include five fluid inlet ports 302e arranged on the surface 122e between the first edge 123e and the second edge 124e along the first direction 201. In some embodiments, plate 120d and plate 120f can include five fluid inlet ports (not shown) respectively arranged on the surface 122d between the first edge 123d and the second edge 124d along the first direction 201, and the surface 122f between the first edge 123f and the second edge 124f along the first direction 201. In some embodiments, plate 120i can include three fluid inlet ports (not shown) arranged on the surface 122i between the first edge 123i and the second edge 124i along the first direction 201. In some embodiments, plate 120b and plate 120h can include five fluid inlet ports (not shown) respectively arranged on the surface 122b between the first edge 123b and the second edge 124b along the first direction 201, and the surface 122h between the first edge 123h and the second edge 124h along the first direction 201. In some embodiments, plate 120c and plate 120g can include four fluid inlet ports (not shown) respectively arranged on the surface 122c between the first edge 123c and the second edge 124c along the first direction 201, and the surface 122g between the first edge 123g and the second edge 124g along the first direction 201.

In some embodiments, providing glass processing apparatus 100 with one or more of the features of the exemplary embodiments of the disclosure, the plurality of air bars 110 and the plurality of plates 120 can facilitate creation and maintenance of the cushion of fluid 105 on which the glass sheet 101 can float.

It will be appreciated that the various disclosed embodiments may involve particular features, elements or steps that are described in connection with that particular embodiment. It will also be appreciated that a particular feature, element or step, although described in relation to one particular embodiment, may be interchanged or combined with alternate embodiments in various non-illustrated combinations or permutations.

It is to be understood that, as used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Ranges can be expressed herein as from "about" one particular value, and/or to "about" another particular value. When such a range is expressed, embodiments include from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

While various features, elements or steps of particular embodiments may be disclosed using the transitional phrase "comprising," it is to be understood that alternative embodiments, including those that may be described using the transitional phrases "consisting" or "consisting essentially of," are implied. Thus, for example, implied alternative embodiments to an apparatus that comprises A+B+C include embodiments where an apparatus consists of A+B+C and embodiments where an apparatus consists essentially of A+B+C.

It will be apparent to those skilled in the art that various modifications and variations can be made to the present disclosure without departing from the spirit and scope of the disclosure. Thus, it is intended that the present disclosure cover the modifications and variations of this disclosure provided they come within the scope of the appended claims and their equivalents.

What is claimed is:

1. A glass processing apparatus to convey a glass sheet along a conveyance path, comprising:
   a plurality of air bars spaced apart from each other along a first direction extending perpendicular to a central axis, each air bar comprising a surface with a plurality of fluid outlet ports; and
   a plurality of plates, at least one of the plurality of plates positioned between ones of the plurality of air bars, each plate comprising a surface with a plurality of fluid inlet ports, the plurality of air bars and the plurality of plates symmetrically arranged relative to the central axis, wherein a widthwise distance extending in the first direction between immediately adjacent outer air bars of the plurality of air bars is less than a widthwise distance extending in the first direction between immediately adjacent central air bars of the plurality of air bars.

2. The glass processing apparatus of claim 1, wherein the surface of each of the plurality of air bars and the surface of each of the plurality of plates extend along a common plane.

3. The glass processing apparatus of claim 1, wherein the surface of each of the plurality of air bars and the surface of each of the plurality of plates define a continuous surface.

4. The glass processing apparatus of claim 1, wherein the surface of each of the plurality of air bars spans a width extending in the first direction from a first edge of the air bar to a second edge of the air bar, and wherein the width of the surface of each of the plurality of air bars is equal.

5. The glass processing apparatus of claim 1, wherein an effective area of the plurality of fluid outlet ports of each air bar of the plurality of air bars is equal.

6. The glass processing apparatus of claim 1, wherein the surface of each of the plurality of plates spans a width extending in the first direction from a first edge of each plate to a second edge of each plate, and wherein the width of the surface of at least one plate of the plurality of plates is different than the width of the surface of one or more other plates of the plurality of plates.

7. The glass processing apparatus of claim 6, wherein the width of the surface of a central plate of the plurality of plates is greater than the width of the surface of an outer plate of the plurality of plates.

8. The glass processing apparatus of claim 1, wherein an effective area of the plurality of fluid inlet ports of at least one plate of the plurality of plates is different than an effective area of the plurality of fluid inlet ports of one or more other plates of the plurality of plates.

9. The glass processing apparatus of claim 8, wherein an effective area of the plurality of fluid inlet ports of each of three centermost plates of the plurality of plates is greater than an effective area of the plurality of fluid inlet ports of each of a first outermost plate of the plurality of plates and a second outermost plate of the plurality of plates.

10. The glass processing apparatus of claim 9, wherein an effective area of the plurality of fluid inlet ports of a first intermediate plate of the plurality of plates positioned between the first outermost plate and the three centermost plates is less than the effective area of the plurality of fluid inlet ports of each of the three centermost plates and greater than the effective area of the plurality of fluid inlet ports of the first outermost plate, and an effective area of the plurality of fluid inlet ports of a second intermediate plate of the plurality of plates positioned between the second outermost plate and the three centermost plates is less than the effective area of the plurality of fluid inlet ports of each of the three centermost plates and greater than the effective area of the plurality of fluid inlet ports of the second outermost plate.

11. The glass processing apparatus of claim 10, wherein an effective area of the plurality of fluid inlet ports of a third intermediate plate of the plurality of plates positioned between the first outermost plate and the first intermediate plate is equal to the effective area of the plurality of fluid inlet ports of each of the three centermost plates, and an effective area of the plurality of fluid inlet ports of a fourth intermediate plate of the plurality of plates positioned between the second outermost plate and the second intermediate plate is equal to the effective area of the plurality of fluid inlet ports of each of the three centermost plates.

12. A method of processing a glass sheet using the glass processing apparatus of claim 1, the conveyance path extending along the central axis, the method comprising conveying the glass sheet along the conveyance path.

13. The glass processing apparatus of claim 1, further comprising a fluid source connected to the plurality of air bars, the fluid source operable to provide fluid to each of the plurality of air bars and to emit fluid from the plurality of fluid outlet ports of each air bar.

14. The glass processing apparatus of claim 13, wherein the fluid source is operable to independently provide fluid to each of the plurality of air bars.

15. The glass processing apparatus of claim 13, wherein the fluid source is operable to emit fluid of differing pressures from the plurality of fluid outlet ports of one or more air bars of the plurality of air bars.

16. The glass processing apparatus of claim 15, wherein the fluid source is operable to emit fluid of a first pressure from the plurality of fluid outlet ports of two centermost air bars of the plurality of air bars and fluid of a second pressure from the plurality of fluid outlet ports of a first outermost air bar of the plurality of air bars and a second outermost air bar of the plurality of air bars, and wherein the first pressure is greater than the second pressure.

17. The glass processing apparatus of claim 16, wherein the fluid source is operable to emit fluid of a third pressure from the plurality of fluid outlet ports of a first of three air bars of the plurality of air bars positioned between the first outermost air bar and the two centermost air bars and from the plurality of fluid outlet ports of a second of three air bars of the plurality of air bars positioned between the second outermost air bar and the two centermost air bars, and wherein the third pressure is less than the second pressure.

18. The glass processing apparatus of claim 13, wherein the plurality of fluid inlet ports of each plate of the plurality of plates are provided without a fluid source connected to the plurality of fluid inlet ports.

19. A method of processing a glass sheet using the glass processing apparatus of claim 13, comprising emitting fluid from the plurality of fluid outlet ports of each of the plurality of air bars, thereby providing a cushion of fluid.

20. The method of claim 19, comprising floating the glass sheet on the cushion of fluid.

21. The method of claim 19, the conveyance path extending along the central axis, the method comprising conveying the glass sheet along the conveyance path on the cushion of fluid.

22. The method of claim 19, comprising passing at least a portion of the emitted fluid through the plurality of fluid inlet ports of each of the plurality of plates after providing the cushion of fluid.

23. The glass processing apparatus of claim 1, wherein the plurality of fluid outlet ports of one or more air bars of the plurality of air bars emit fluid at differing pressures.

24. The glass processing apparatus of claim 1, wherein the plurality of fluid outlet ports of two centermost air bars of the plurality of air bars emit fluid at a first pressure and the plurality of fluid outlet ports of a first outermost air bar of the plurality of air bars and a second outermost air bar of the plurality of air bars emit fluid at a second pressure, and wherein the first pressure is greater than the second pressure.

25. A glass processing apparatus to convey a glass sheet along a conveyance path, comprising:
    a plurality of air bars spaced apart from each other along a first direction extending perpendicular to a central axis, each air bar comprising a surface with a plurality of fluid outlet ports;
    a plurality of plates, at least one of the plurality of plates positioned between ones of the plurality of air bars, each plate comprising a surface with a plurality of fluid inlet ports, the plurality of air bars and the plurality of plates symmetrically arranged relative to the central axis; and
    a fluid source connected to the plurality of air bars, wherein the fluid source is operable to emit fluid of differing pressures from the plurality of fluid outlet ports of one or more air bars of the plurality of air bars.

\* \* \* \* \*